UNITED STATES PATENT OFFICE.

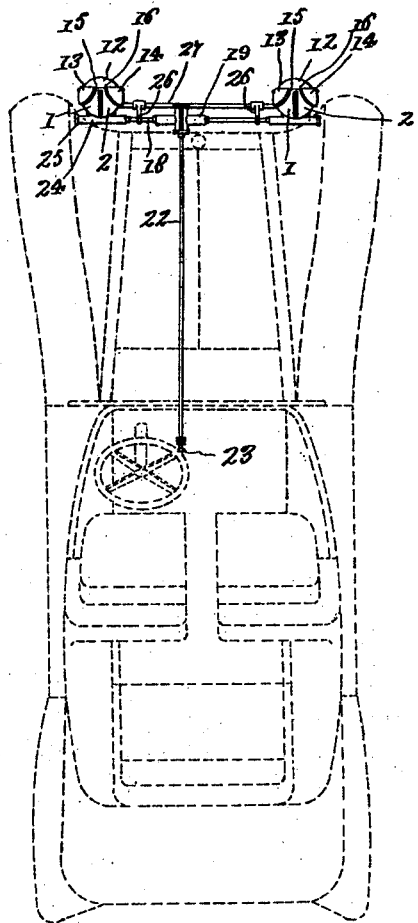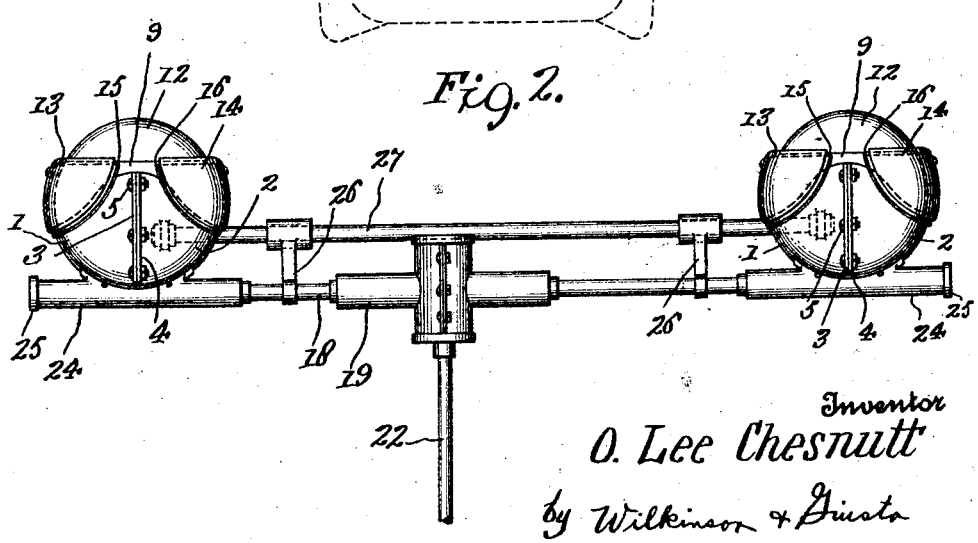

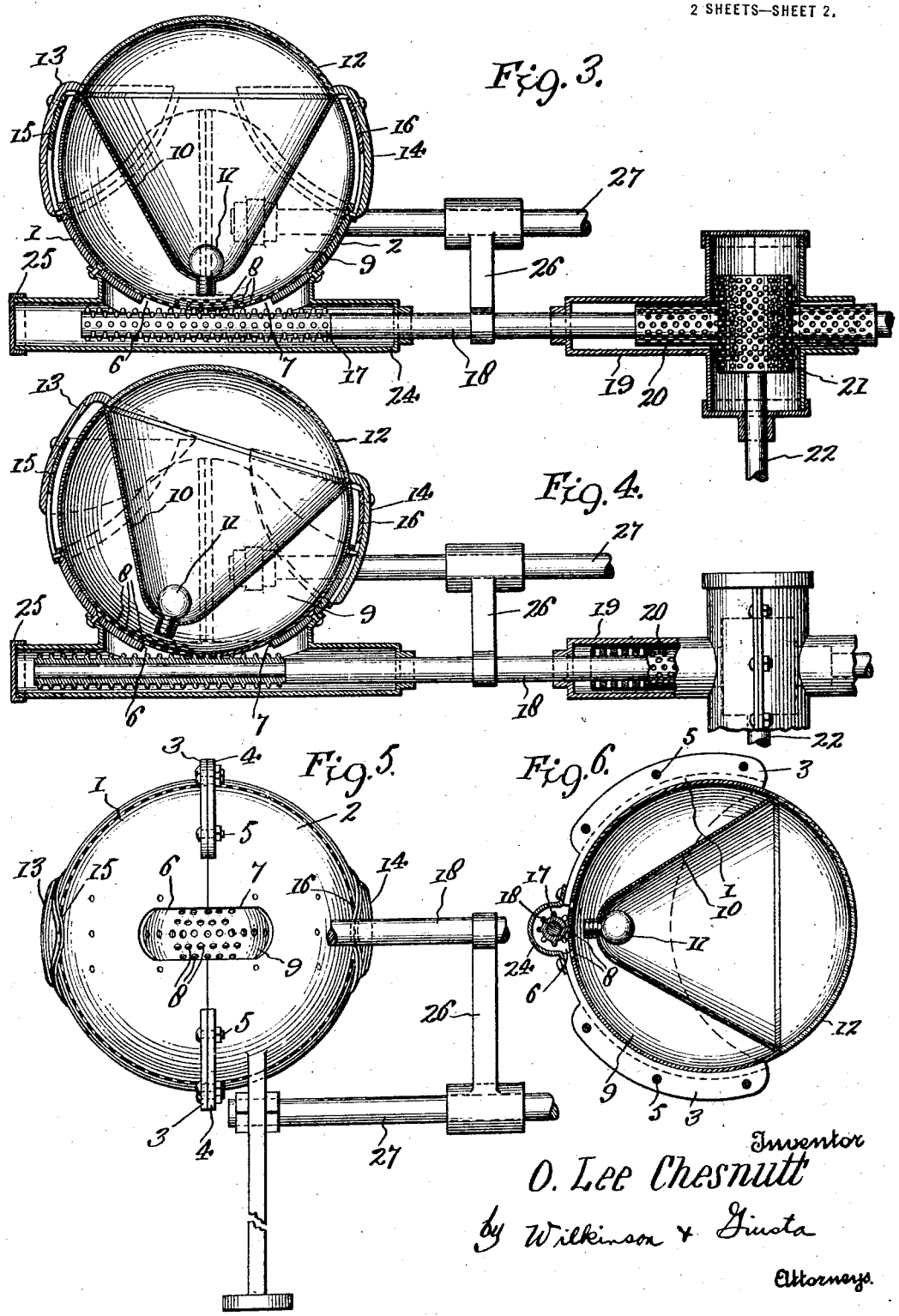

OWEN LEE CHESNUTT, OF ATLANTA, GEORGIA.

ADJUSTABLE HEADLIGHT.

1,410,370.   Specification of Letters Patent.   Patented Mar. 21, 1922.

Application filed June 10, 1921. Serial No. 476,504.

*To all whom it may concern:*

Be it known that I, OWEN LEE CHESNUTT, a citizen of the United States, residing at Atlanta, in the county of Fulton and State of Georgia, have invented certain new and useful Improvements in Adjustable Headlights; and I do hereby declare the following to be a full, clear, and exact description of the invention, such as will enable others skilled in the art to which it appertains to make and use the same.

The present invention relates to improvements in adjustable lamps more particularly for use in connection with the headlights of automobiles and other vehicles for the purpose of directing the rays of the lamps laterally from the usual rigid straight position, to the end that motorists may be enabled to illuminate corners of the roadway in making turns.

An object of the invention is to provide a lamp having a substantially universal movement similar to that of the human eye and which may consequently move to a variety of positions, giving a large range of adjustment and enabling the driver of the vehicle to direct the rays of the lamps throughout a wide field.

Another object of the invention lies in providing an improved mechanism for actuating the lamps and for causing them to assume various angular positions with respect to the horizontal and vertical, and to provide these desirable characteristics in an inexpensive and compact structure such as is capable of application to existing types of automobile bodies.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a dotted plan view of an automobile shown equipped with headlight lamps constructed according to the present invention.

Fig. 2 is an enlarged plan view of the lamps.

Fig. 3 is an enlarged horizontal sectional view of one of the lamps and a portion of the actuating mechanism.

Fig. 4 is a somewhat similar view of the parts in another position.

Fig. 5 is a rear view of one of the lamps and adjacent parts; and

Fig. 6 is a vertical sectional view through one of the lamps.

Referring more particularly to the drawings, each lamp is preferably constructed as more particularly shown in Figs. 3 to 6 inclusive, in which 1 and 2 designate half sections of a partially spherical mounting which constitutes the socket of the universal construction. These half sections are provided with flanges 3 and 4, respectively, at their meeting edges through which pass bolts or other securing means 5. Complemental slots 6 and 7 in the sections 1 and 2 fit together as shown in Fig. 5 to expose numbers of perforations 8 in the lamp casing 9, which is also of a partly spherical construction in order to fit within the sections 1 and 2 and having a universal movement therein.

Within the casing 9 is a reflector 10 and bulb or other source of illumination 11. The lens 12 is carried by the outer portion of the casing 9 and is movable therewith. In a similar manner guides 13 and 14 are secured to the casing 9 and move therewith. These guide members are associated with companion inner guide members 15 and 16 connected to the sections 1 and 2. The pairs of guide members are expansible, as indicated in Fig. 4.

Gear elements 17 are provided in conjunction with each of the lamps and they are of an elongated construction capable of both a rotary and an axially shifting movement. These gear elements are provided with teeth and they are so situated that the teeth extend through the slots 6 and 7 and engage in the openings 8 made in the lamp casing 9.

It will be seen in Fig. 5 that the openings 8 extend both in a vertical and in a horizontal direction so that upon turning of the gear element 17 a shifting of the lamp casing in a vertical plane will result; while a longitudinal shifting movement of the gear element 17 will be accompanied by a corresponding lateral shifting of the lamp casing in one or the other horizontal directions accordingly as the element is shifted to the right or left.

The gear elements 17 are mounted on the ends of a shaft 18 which extends through a central casing 19 adapted to contain an intermediate gear element 20 of a form similar to the element 17. This element 20 is also longitudinally slidable and rotatable and for this purpose the casing 19 is formed with a relatively elongated chamber transversely of the vehicle to permit of this movement. The motion imparted to the intermediate gear element 20 is communicated to the shaft 18 and through this means is imposed upon the two gear elements 17 associated with both headlight lamps.

The casing 19 is also adapted to contain a toothed pinion 21 capable of a longitudinally shifting movement at right angles to the axis of the shaft 18 and being in mesh with the teeth of the intermediate gear element 20. The pinion 21 is also shiftable along its under axis and for the purpose of selectively accomplishing either a rotation of the pinion or an axial shifting thereof, such pinion is carried on the end of a shaft 22 which may be flexible or otherwise and extends to the dash board of the vehicle where it is provided with an operating member 23.

Casings 24 are adapted to house the end gear element 17, and for convenience they may be attached to the sections 1 and 2 and are preferably provided with removable caps 25 for giving access through their ends. Bearings 26 for the shaft 18 are secured to the cross rod 27 which connects the supporting brackets of the lamps.

In use the driver of the vehicle sits in the usual seat at the steering wheel and when negotiating a turn may have recourse to the operating member 23 in order to direct the lamps in a desired direction. This is accomplished by either turning the operating member 23 or pulling or pushing upon it. By these movements a corresponding turning or shifting of the pinion 21 will follow. Upon a shifting of the pinion 21 upwardly, as shown in Fig. 3, a rotary movement will be communicated to the intermediate gear element 19 turning the shaft 18, and both of the end gear elements 17, in such wise that the casings 9 of both lamps together with their reflectors and illuminating sources are directed upwardly. A movement of the pinion 21 downwardly will be attended by the opposite result and the rays will be turned downwardly upon the road immediately in advance of the vehicle.

A turning of the shaft 22 and pinion 21 will shift the intermediate gear element 20 and also the end element 17 transversely of the vehicle and the lamps will be either turned as shown in Fig. 4 or in an opposite direction to this showing, thus illuminating dark corners in the roadway.

It is understood that a great variety of movements may be imposed upon the lamp casing by reason of combined movements of the pinion 21. For instance, the pinion may be both shifted axially and rotated partially with a corresponding turning of the lamp casing both vertically and horizontally to a proportionate degree. In this manner both of the headlight lamps may be shifted in their sockets very much as the human eye-ball is, and the adjustment may be accomplished quickly and conveniently from use of a single operating member 23.

It will also be appreciated that headlight lamps constructed as herein described may be made to replace the conventional form of rigid lamps without incurring any modification in the construction of the vehicle. Moreover, the construction is exceedingly compact and may be manufactured at small cost and thus form an accessory that is easily procurable.

It is obvious that those skilled in the art may vary the details of construction and arrangements of parts without departing from the spirit of my invention, and therefore I do not wish to be limited to such features except as may be required by the claims.

I claim:

1. An improved adjustable lamp comprising a socket mounting, a lamp casing having a ball structure mounted in said socket for universal movement, said casing having openings therein, and a rotary and longitudinally shiftable gear element having teeth adapted to enter the openings in said casing, substantially as described.

2. An improved adjustable lamp comprising a casing having a source of illumination therein, a reflector in the casing, a lens closing the outer end of the casing, a socket mounting for the casing, guide members extensibly fitted together and connected between said casing and mounting, and means for shifting said casing universally, substantially as described.

3. A pair of headlight lamps for automobiles having a universal movement on the vehicle, the lamps provided with openings, and simultaneously rotatable and axially shiftable gear elements having teeth meshing in the openings, substantially as described.

4. A pair of headlight lamps for vehicles mounted for universal movement and having series of vertically and horizontally expanding openings therein, a pair of elongated gear elements having teeth meshing in the openings, said gear elements being longitudinally shiftable and also rotatable, a shaft connecting gear elements, and intermediate rotary and longitudinally shiftable gear elements on said shaft, and a longitudinally shiftable and rotatable pinion meshing with the intermediate gear element, substantially as described.

OWEN LEE CHESNUTT.